United States Patent [19]

Schnabel et al.

[11] 4,368,177

[45] Jan. 11, 1983

[54] PROCESS OF PRODUCING QUICKLIME BY CALCINING IN A ROTARY KILN

[75] Inventors: Wolfram Schnabel, Hattersheim; Gerhard Reuter, München-Aschheim; Herbert Lausch, Frankfurt am Main, all of Fed. Rep. of Germany

[73] Assignee: Metallgesellschaft Aktiengesellschaft, Frankfurt am Main, Fed. Rep. of Germany

[21] Appl. No.: 250,490

[22] Filed: Apr. 2, 1981

[30] Foreign Application Priority Data

Apr. 2, 1980 [DE]  Fed. Rep. of Germany ....... 3012866

[51] Int. Cl.$^3$ ....................... C01F 11/04; C01F 11/06
[52] U.S. Cl. .................................. 423/175; 423/177; 423/637
[58] Field of Search ............... 423/155, 168, 175, 177, 423/636, 637

[56] References Cited

U.S. PATENT DOCUMENTS 4,220,631  9/1980  Serbent et al. ..................... 423/637
4,259,081  3/1981  Reuter et al. ...................... 423/177

FOREIGN PATENT DOCUMENTS 2719347  9/1978  Fed. Rep. of Germany .

*Primary Examiner*—O. R. Vertiz
*Assistant Examiner*—Wayne A. Langel

*Attorney, Agent, or Firm*—Sprung, Horn, Kramer & Woods

[57] ABSTRACT

A process is disclosed for producing quicklime by a calcining treatment with a hot gas in a rotary kiln, wherein solid carbonaceous fuel for producing hot gas is fed into the charging end of the rotary kiln and an oxygen-containing gas is blown through nozzle blocks into the charge disposed over nozzle blocks in the heating-up zone beginning at the point where ignitable particles of the solid fuel first appear, the improvement wherein:

(a) an oxygen-containing gas is blown through nozzle blocks into the charge disposed over nozzle blocks in that region of the heating-up zone which begins with the appearance of ignitable particles of the solid fuels and which ends where the temperature in the charge does not rise further;

(b) oxygen-containing gases are blown through nozzle blocks into the charge disposed over nozzle blocks in a calcining zone which succeeds said heating-up zone and at such a rate that the temperature in the charge is held constant and for as long as the temperature remains constant, (c) oxygen-containing gases are blown into the free kiln space where the kiln atmosphere contains combustible gaseous constituents, and (d) the rates at which oxygen-containing gases are blown into the free kiln space are so controlled that the exhaust gas is virtually free from combustible gaseous constituents.

7 Claims, No Drawings

PROCESS OF PRODUCING QUICKLIME BY CALCINING IN A ROTARY KILN

BACKGROUND OF THE INVENTION

1. Field of the Invention

This invention relates to a process of producing quicklime by a calcining treatment with hot gases in a rotary kiln, wherein solid carbonaceous fuel for producing hot gases is fed into the charging end of the rotary kiln and oxygen-containing gases are blown through nozzle blocks into the charge disposed over nozzle blocks in the heating-up zone beginning at the point where ignitable particles of the solid fuel first appear.

2. Discussion of Prior Art

Quicklime having a high reactivity is increasingly made in a rotary kiln although the latter has a higher heat consumption than the shaft furnace. But the rotary kiln produces lime of higher and more uniform quality and can process particles smaller than 30 mm. Such lime, which is particularly used to make electric steel, should also have a low sulfur content. This sulfur content is mainly due to the sulfur content of the fuels which have been used. The sulfur content of the quicklime can be minimized primarily by the use of low-sulfur fuel and also by heating the limestone in the rotary kiln with hot combustion gases produced in a central burner or in shell burners or shell nozzles, i.e., so as to avoid a direct contact between the unburnt fuel and the charge (Zement-Kalp-Gips, No. 2, 1969, pages 75 to 81; French Pat. No. 1,487,240; U.S. Pat. No. 2,941,791; German Pat. No. 618,872.

Because low-sulfur fuels are more expensive than high-sulfur fuels, the use of the former adds to the costs of the process particularly because it has a high heat requirement. In a rotary kiln there is only a very low heat transfer from the flames and hot gases of the kiln atmosphere to the solid charge, particularly in the heating-up zone, because heat is mainly transferred on the surface of the charge. As a result, the exhaust gases have a high content of heat which has been produced by a combustion of relatively expensive fuels. This is also true for the processes in which the sulfur content of the quicklime is minimized by calcining in a neutral or reducing atmosphere (German Pat. No. 1,108,603; Czechoslovakian Pat. No. 127,978). That process also involves a risk of temperature fluctuations and hot spots if the oxygen supply varies. That risk can be avoided only in part by the provision of expensive sealing means preventing an infiltration of air.

It is known from German Offenlegungsschrift No. 2,719,347 to reduce the heat requirement of a rotary kiln for producing a highly reactive, low-sulfur lime in that solid carbonaceous material is fed through the charging end of the rotary kiln and oxygen-containing gases are blown through nozzle blocks into the charge disposed over nozzle blocks and through shell tubes into the free kiln space in that region of the rotary kiln which begins with the appearance of ignitable particles of the fuel and ends up to 50% of the kiln length. The succeeding region of the kiln is supplied with oxygen-containing gases through shell tubes or with additional fuel through shell burners or a central burner. In that process the heating-up zone of the rotary kiln is much reduced in length and the total energy consumption is much reduced also because the heat content of the volatile combustible constituents of the solid fuel is utilized to a large extent. As a result, more high-sulfur fuel can be used to produce a lime having a given sulfur content or the use of a solid fuel having a given sulfur content will result in a lower sulfur content of the lime because less solid fuel is employed.

It is an object of the invention further to improve the process described hereinbefore and further to decrease the heat requirement of a rotary kiln used to produce highly reactive, low-sulfur quicklime.

SUMMARY OF THE INVENTION

This object is accomplished according to the invention in that (a) oxygen-containing gases are blown through nozzle blocks into the charge disposed over said nozzle blocks in that region of the heating-up zone which begins with the appearance of ignitable particles of the solid fuels and which ends where temperature in the charge does not rise further;

(b) oxygen-containing gases are blown through nozzle blocks into the charge disposed over nozzle blocks in the succeeding calcining zone and at such rates that the temperature in the charge is held constant and as long as the temperature remains constant, (c) oxygen-containing gases are blown into the free kiln space, above the charge, where the kiln atmosphere contains combustible gaseous constituents, and (d) the rates at which oxygen-containing gases are blown into the free kiln space are so controlled that the exhaust gas is virtually free from combustible gaseous constituents.

The solid carbonaceous fuel is utilized in a particle size up to 100 mm. The upper particle size limit depends on the disintegrating behavior. Fuels are selected which release $SO_2$ and $SO_3$ in quantities which are sufficiently small in view of the permissible sulfur content of the lime. Particularly suitable are highly reactive, non-cokable coals. Coals may be used in a raw state whose moisture content is up to 60% or in a dried or devolatilized state. Long rotary kiln installations are preferably supplied with raw coal through the charging end of the kiln. Short rotary kilns in combination with a preheater are preferably supplied with devolatized coal through the charging end of the kiln. Coals having a high content of the volatile combustible constituents are fed at such a rate that the amount of volatile combustible constituents in the waste gas is about zero and the volatile combustible constituents are utilized in the kiln.

Ignitable particles of the solid fuel begin to appear in the heating-up zone in the lower portion of the rolling surface of the charge. As the individual particles roll down on the surface of the rolling bed, the particles are heated up by the hot kiln gases and at a certain distance from the charging end reach the ignition temperature for the first time shortly before they are drawn into the rolling bed. This is the first point where oxygen-containing gases are blown into the bed through nozzle blocks. As a result, ignitable and ignited particles of the solid fuel will not be cooled below the ignition temperature as they are drawn into the colder interior of the rolling bed but will continue to burn in the rolling bed. The ensuing combustion within the charge results in what might be termed "chain reaction" whereby there is a release of additional combustible volatile constituents and this release soon spreads throughout the cross-section of the charge. The heat content of the combustible volatile constituents is now fully utilized to heat the charge, and the heat exchange surface area which is available for a heat transfer is greatly increased.

Additional nozzle blocks spaced about 2.5 to 3.5 meters apart are arranged in the above-mentioned region of the heating-up zone. That spacing is generally sufficient for a blowing of sufficient oxygen into the bed and does not unduly weaken the kiln structure.

At each blowing-in point, the nozzle blocks are arranged in an annular array of nozzle blocks spaced around the periphery of the kiln. The peripheral spacing is generally also 2.5 to 3.5 meters. Control mechanisms may be used to adjust the flow rate through each nozzle block to the required value, which may be zero. Alternatively, the nozzle blocks may be arranged along a helix.

The oxygen-containing gases preferably consist of air although other oxygen-containing gases can be used alone or in admixture with air. The term "nozzle blocks" describes gas feeders which extend through the kiln wall and the refractory lining of the rotary kiln and have outlet openings disposed in the inside surface of the refractory lining or slightly spaced radically outwardly or inwardly from said surface. That region of the rotary kiln which has been defined in (a) above begins at that point of the rotary kiln where the particles of the rotary kiln have reached a temperature of about 300° C. shortly before they are drawn into the rolling bed and ends where the charge has approximately the desired calcining temperature, generally at least 900° C., preferably 950° to 1050° C. The rate at which oxygen-containing gases are blown through nozzle blocks in the charge are so controlled that the charge is heated to the calcining temperature as quickly as possible. Volatile constituents of the fuel are released in that zone and their combustible constituents are burnt in the free kiln space over the charge.

The nozzle blocks in the calcining zone of the rotary kiln mentioned in (b) above are correspondingly arranged and operated. In that zone the solid carbon of the fuel is burned mainly in the charge bed. The calcining temperature is adjusted to about 900° to 1100° C. and preferably to 950° to 1050° C. The rate at which oxygen-containing gases are blown through nozzle blocks into the charge is so controlled that the temperature is held as constant as possible throughout the length of the calcining zone. The blowing into the charge is discontinued at that point of the charge's travel toward the discharge end of the rotary kiln where the temperature drops, i.e., where the solid fuel in the charge has almost been used up.

In the free kiln space mentioned in (c), the combustible constituents in the kiln atmosphere are burned by a supply of oxygen-containing gases through nozzle blocks that are not covered by the charge and/or through shell tubes. The shell tubes extend radically through the kiln and their outlet openings are approximately at the center of the cross-section of the kiln and are directed parallel to the longitudinal axis of the kiln. As a result, the outlet openings are not covered by the charge so that only one shell tube is required for each blowing-in station.

The locations at which gases are blown into the free kiln space and the blowing rate at each of said locations are so controlled that the combustible constituents entering the kiln atmosphere are virtually completely burned until they leave the rotary kiln. As a result, the combustible volatile constituents are utilized in the kiln. The control of the blowing will depend on the rate at which combustible volatile constituents are released in the respective sections of the kiln in consideration of the quantity of free oxygen which is already present in the kiln atmosphere. Air is generally used as the oxygen-containing gas.

The process according to the invention can be carried out in a rotary kiln through which the charge and the kiln atmosphere are moved cocurrently as well as in a rotary kiln in which the charge and the kiln atmosphere are countercurrently moved. Compared to countercurrent operation, cocurrent operation results in a better utilization of heat but requires a higher expenditure for equipment for utilizing the exhaust gas heat if the same is used to preheat the raw material. Otherwise, the exhaust gas must be used to generate extraneous heat.

According to a preferred further feature, part of the fresh solid carbonaceous fuel is introduced into the rotary kiln through a central burner by sub-stoichiometrically combusting therein a fine-grained coal. This permits an introduction even of very fine-grained coal in a simple manner. The central burner is disposed at the charging end for cocurrent operation and at the discharge end of the rotary kiln for countercurrent operation.

In accordance with a preferred further feature of the invention when used in a countercurrent process, part of the fresh solid carbonaceous fuel is introduced from the discharge end of the rotary kiln and distributed over a substantial length of the charge bed. The introduction is preferably pneumatically effected by means of entraining air. The fuel introduced in this way has a particle size below 15 mm. An injection of solid fuel is particularly used where the fuel consists of coal having a high content of combustible volatile constituents, such as lignite. In that case the coal injection rate and the rate at which coal is fed at the charging end are so matched the the combustible volatile constituents are virtually completely burned in the kiln atmosphere and are virtually absent from the exhaust gas. Dry coal is preferably injected.

According to a preferred further feature, in countercurrent operation a central burner is used to introduce heat from the discharge end of the rotary kiln at the rate required to heat to about 1100° to 1250° C. the oxygen-containing gases introduced from the discharge end. The centrally supplied air consists of preheated air, which is recovered by the cooling of the quicklime discharged from the rotary kiln. By means of the central burner, which is preferably fired with pulverized coal, that air is heated to the stated temperature. This will permit an economical utilization of the heat which is recovered by cooling.

According to a further preferred feature, in countercurrent operation oxygen-containing gases are blown through at least one shell tube into the free kiln space in that region of heating-up zone which precedes the appearance of ignitable particles of the solid fuel. In this way, the combustible volatile constituents, particularly if they are evolved at high rates, can be virtually completely burned in the rotary kiln.

According to a further preferred feature, in countercurrent operation the final calcination is effected in a shaft cooler and the exhaust gas from the shaft cooler is blown into the rotary kiln. In that practice the residual solid carbon is reacted in the uppermost layer of the pile in the cooler and additional heat is supplied to the cooling air by the resulting combustion of CO to form $CO_2$, which is supplied to the rotary kiln. This practice improves the thermal economy and efficiency of the overall process.

According to a still further preferred feature, the rotary kiln is operated in a cocurrent process, calcium-containing material is charged in a hot state and carbonaceous material in a cold state through the charging end, and oxygen-containing gases introduced through nozzle blocks are blown through the charge shortly behind the charging end. In this case the carbonaceous material is ignited without need for a central burner, and the cold carbonaceous material is heated up in a very short length of the kiln. As a result, the kiln may be very short and the hot exhaust gases can be recycled in a very short conduit to a station for preheating the calcium-containing material, suitably to a shaft.

The invention is explained more fully with reference to examples.

A pilot rotary kiln was used, which had a length of 12 meters and an inside diameter of 0.8 meter. The kiln was provided with nozzle blocks spaced 1 meter apart, i.e., from 1 meter to 11 meters of the length of the kiln. The nozzle blocks were adapted to be supplied with air at controlled rates or to be shut down independently of each other. For countercurrent operation, a shell tube was provided, which was spaced 1 meter from the charging end and had an outlet opening facing the charging end.

The fuel consisted of subbituminous lump coal having a moisture content of 36% and a particle size below 25 mm. The coal had the following composition, based on dry coal:
  Fixed carbon (FC): 48%
  Volatile constituents: 44%
  Ash: 8%

The charged limestone had a particle size of 8 to 40 mm.

EXAMPLE 1

The rotary kiln was used in countercurrent operation.
Materials charged
  Limestone: 600 kg/h
  Coal
    (a) from charging end, below 25 mm: 125 kg/h
    (b) from discharge end, below 10 mm: 45 kg/h
  Air supply (total): 900 st. m³/h
    (a) 30% of the air were supplied to the heating-up zone in equal parts into the charge and the free kiln space.
    (b) 50% of the air were supplied to the calcining zone in equal parts into the charge and the free kiln space.
    (c) 20% of the air were centrally supplied into the free kiln space from the discharge end.
Heating-up zone
  About 40% of length of kiln
  Solids temperature at the end: 880° C.
  Gas temperature at the end: 1100° C.
Calcining zone:
  About 60% of length of kiln
  Solids temperature:
    (a) Maximum 1 meter before discharge end: 970° C.
    (b) At discharge end: 930° C.
  Maximum gas temperature 1 m before discharge end: 1160° C.
Exhaust gas:
  Temperature: 660° C.
  Combustible constituents: below 0.5%
  Oxygen: about 1%
Discharged solids:
  $CO_2$ content of lime: below 1%
  C fix content: below 0.1%
  Particle size of ash: below 1 mm The discharged solids were indirectly cooled in a cooling drum with trickling water. The ash was subsequently screened out.

The equipment available did not permit a utilization of the heat recovered by cooling. In an evaluation of the heat consumption, the high dissipation through the walls of the relatively small pilot kiln must be taken into account.

When the air supplied to the calcining zone was delivered only into the gas space but at the same total rate, there was an average temperature increase of 100° C. of the gas in the gas space and an increase of the exhaust gas temperature to 750° C. However, a sufficient deacidification could no longer be effected and the $CO_2$ content varied between 4 and 8%. The carbon content in the solids discharged from the kiln increased to 5%. The content of combustible constituents in the gas was approximately the same.

When the mode of operation described above first was conducted and the coal supply through the charging end was increased and the coal supply through the central blower at the discharge end was correspondingly decreased, the proportion of combustible constituents in the exhaust gas increased and the temperature of the exhaust gas decreased. When coal was supplied at a rate of 150 kg/h through the charging end and at a rate of 20 kg/h through the discharge end of the kiln, the exhaust gas temperature decreased below 600° C. and almost 3% combustible constituents were detected in the exhaust gas.

The utilization of the heat recovered by cooling resulted in a decrease of the heat consumption by about 8 to 12%.

EXAMPLE 2

The rotary kiln was used for cocurrent operation. A gas-fired central burner installed at the charging end of the kiln was used to heat the coal particles at the surface to the ignition temperature. As these particles enter the bed, the heat content of the volatile constituents of the coal is released by means of air supplied through the shell nozzles and the bed is heated to the calcining temperature.

The rate and quality of the material supplied for calcining remained constant, as in countercurrent operation. But now coal at the entire rate of 170 kg of moist coal per hour was supplied in a particle size below 25 mm through the charging end. Air was supplied at a rate of about 950 standard m³/h, exclusive of the air supplied to the central burner. About 60% of that air were supplied to the heating-up zone. In the heating-up zone and in the calcining zone, air was supplied to the gas space and the bed in approximately equal part.

In this operation, the final acidity ($CO_2$ content) of the lime and the residual content of fixed carbon in the solids discharged from the kiln were also lower than 1% and 0.1% respectively.

Natural gas at a rate of 16 standard m³/h was supplied to the central burner. The burner was also supplied with an air excess of 10%. The exhaust gas leaving the discharge end of the kiln had a temperature of 1050° C. and contained 2% oxygen and combustible constituents were not detected. The heating-up zone constituted about 40% of the length of the kiln. The charge had a temperature of 890° C. at the end of that zone and its temperature increased to 990° C. at the discharge end of the kiln. The gas temperature reached a maximum of 1250° C. about 1.5 meters from the charging end of the kiln and then decreased to 1050° C. at the discharge end of the kiln. The hot exhaust gas might be used to preheat the limestone in a shaft preheater. This would eliminate the need of a central burner at the charging end of the kiln.

The advantages of the invention reside in that the heat consumption of the rotary kiln can be lowered because heat is generated at any point of the rotary kiln only at the rate at which it is consumed by the heat-consuming reactions. As a result, the same fuel will supply less sulfur to the lime. The fact that gases leave the bed at high rates also tends to decrease the sulfur content of the lime. The reaction of $CO_2$ with C in the bed results in a lower partial pressure of $CO_2$ so that the calcination is accelerated and a more active lime is produced. The heat transfer coefficient is improved so that internal fixtures are not required and there is only a low dissipation through the walls. Hot spots are avoided because the gas and bed temperatures are close to each other. The lower temperatures increase the life of the refractory lining and annular crusts are avoided. The operation is highly flexible. The kiln can be operated with a high fill factor and high throughout rates per unit of cross-sectional area of the kiln can be obtained.

Recapitulating, the process of the invention is generally carried out using a rotary kiln whose heating-up zone comprises 40 to 70 percent of the length of the kiln and whose calcination zone comprises 30 to 60 percent of the length thereof. The kiln itself can be 50 to 100 meters in length, dependent upon the desired capacity.

As solid carbonaceous fuels there can be used, inter alia, coal, coke, and lignite or compositions containing the same. When the process is to be conducted by feeding a portion of the solid fuel into the discharge end, 20 to 40 weight percent of the entire solid fuel employed can be introduced at the discharge end.

The heating-up zone, defined by the point at which ignitable particles of the solid fuel first appear and the point where the temperature does not further rise, generally does not extend beyond 70 percent of the length of the rotary kiln. It is fed with oxygen-containing gases from nozzle blocks below the rolling charge. The amount of such gas is generally 10 to 40 percent by volume of the total oxygen-containing gas introduced into the rotary kiln. In the heating-up zone, the charge is heated up to a temperature of at least 900° C., preferably 950° to 1050° C.

Thereafter the charge together with solid carbonaceous fuel moves from the heating-up zone to the succeeding calcination zone where the temperature is held substantially constant. This zone is defined by the terminal end of the heating up zone and the point where the charge begins to cool as it passes toward the discharge end. In this portion of the rotary kiln, which can comprise 30 to 60 percent of the kiln's length, the charge is maintained at a constant temperature by the introduction of oxygen-containing gas into the charge, through nozzle blocks disposed therebelow and by introduction into the free kiln space. The oxygen-containing gas introduced through such nozzle blocks of the calcining zone can comprise 20 to 40 percent by volume of the total oxygen-containing gas introduced into the rotary kiln.

Oxygen-containing gases are blown into the free kiln spaces so that the exhaust gas withdrawn therefrom is virtually free from combustible gaseous components. These combustible gaseous components include such substances as CO, $H_2$, hydrocarbons. The content thereof in the exhaust gas is generally below 1 volume percent, preferably below 0.5 volume percent.

What is claimed is:

1. In a process for producing quicklime by a calcining treatment with a hot gas in a rotary kiln, wherein solid carbonaceous fuel for producing hot gas is fed into the charging end of the rotary kiln and an oxygen-containing gas is blown through nozzle blocks into the charge disposed over nozzle blocks in the heating-up zone beginning at the point where ignitable particles of the solid fuel first appear, the improvement wherein:
    (a) an oxygen-containing gas is blown through nozzle blocks into the charge disposed over nozzle blocks in that region of the heating-up zone which begins with the appearance of ignitable particles of the solid fuels and which ends where the temperature in the charge does not rise further, said heating-up zone comprising 40-70% of the length of the kiln;
    (b) oxygen-containing gases are blown through nozzle blocks into the charge disposed over nozzle blocks in a calcining zone which succeeds said heating-up zone and at such a rate that the temperature in the charge is held constant and for as long as the temperature remains constant, said calcining zone comprising 30 to 60% of the length of the kiln;
    (c) oxygen-containing gases are blown into the free kiln space where the kiln atmosphere contains combustible gaseous constituents, and
    (d) the rates at which oxygen-containing gases are blown into the free kiln space are so controlled that the exhaust gas is virtually free from combustible gaseous constituents.

2. A process according to claim 1, wherein a portion of the fresh solid carbonaceous fuel is introduced into the rotary kiln, through a central burner wherein fine-grained coal is sub-stoichiometric combusted.

3. A process according to claim 1, in a countercurrent operation, an additional portion of the fresh solid carbonaceous fuel is introduced from the discharge end of the rotary kiln and is distributed over a substantial length of the charge bed.

4. A process according to claim 1 wherein, in a countercurrent operation, a central burner is dispersed at the discharge end of the rotary kiln and emits heated gases at a rate sufficient to heat the oxygen-containing gases introduced from the discharge end to about 1100° to 1250° C.

5. A process according to claim 1, wherein, in a countercurrent operation, oxygen-containing gases are blown through at least one shell tube into the free kiln space in that region of the heating-up zone which precedes the appearance of ignitable particles of the solid fuel.

6. A process according to claim 1, wherein in a countercurrent operation, the final calcination of the limestone is effected in a shaft cooler and the exhaust gas from the shaft cooler is blown into the rotary kiln.

7. A process according to claim 1, wherein said rotary kiln is operated in a cocurrent process, calcium-containing material is charged in a preheated state and solid carbonaceous material in a cold state through the charging end, and oxygen-containing gases introduced through nozzle blocks are blown through the charge shortly behind the charging end.

* * * * *